United States Patent

[11] 3,624,093

| [72] | Inventors | Theodore S. Sulkowski<br>Wayne;<br>Albert A. Mascitti, Norristown, both of Pa. |
|---|---|---|
| [21] | Appl. No. | 18,305 |
| [22] | Filed | Mar. 10, 1970 |
| [45] | Patented | Nov. 30, 1971 |
| [73] | Assignee | American Home Products Corporation<br>New York, N.Y. |

[54] 5,6-DISUBSTITUTED-2,3,5,6-
TETRAHYDROIMIDAZO-[2,1-α]ISOQUINOLIN-6-
OLS
11 Claims, No Drawings

[52] U.S. Cl...................................................... 260/288 R,
260/283 S, 260/297 R, 260/309.6, 260/332.3 R,
260/599, 424/258

[51] Int. Cl.............................................................. C07d 35/10
[50] Field of Search............................................ 260/288,
288 A

[56] References Cited
UNITED STATES PATENTS

| 3,200,213 | 8/1965 | Richardson .................. | 260/288 |
| 3,487,087 | 12/1969 | Sarett........................... | 260/288 X |
| 3,557,120 | 1/1971 | Archer ......................... | 260/288 |

OTHER REFERENCES
Nair et al., Indian Jour. Chem., Vol. 5, p. 403– 408 (1967).

Primary Examiner—Donald G. Daus
Attorney—Joseph Martin Weigman

ABSTRACT: Novel 5,6-disubstituted-2,3,5,6-tetrahydroimidazo-[2,1-α]isoquinolin-6-ols have been prepared which are useful anti-inflammatory agents.

5,6-DISUBSTITUTED-2,3,5,6-TETRAHYDROIMIDAZO-[2,1-a]ISOQUINOLIN-6-OLS

DESCRIPTION OF THE INVENTION

This invention relates to new and novel compounds of formula I and to processes for their production.

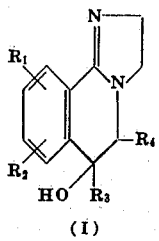

(I)

wherein $R_1$ is selected from the group consisting of hydrogen, halogen, amino (lower)alkylamino, (lower)alkyl and (lower)alkoxy; $R_1$ is hydrogen when $R_1$ and $R_2$ are dissimilar and when $R_1$ and $R_2$ are the same they are both selected from the group consisting of hydrogen, halogen, (lower)alkyl and (lower)alkoxy; $R_3$ and $R_4$ are independently selected from the group consisting of phenyl, monohalophenyl, dihalophenyl, mono(lower)alkylphenyl, di(lower)alkylphenyl, trifluoromethylphenyl, mono(lower)alkoxyphenyl, di(lower)alkoxyphenyl, thienyl, pyridyl, furyl and tetrahydro-2-naphthyl.

The compounds of the invention are prepared by condensing 2-(2-imidazolin-2-yl)benzhydrols with an appropriate aromatic or heteroaldehyde in the presence of catalytic amounts of p-toluenesulfonic acid. The condensation is carried out as follows:

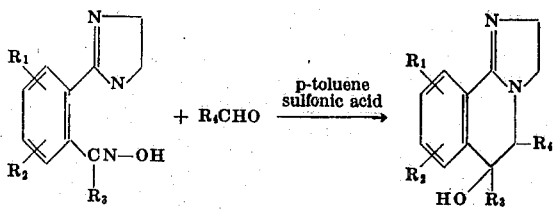

wherein $R_1$, $R_2$, $R_3$ and $R_4$ are the same as defined hereinabove.

The condensation is effected by refluxing the reactants in an organic solvent such as toluene, benzene, xylene, chloroform, carbon tetrachloride, etc. The flask should be equipped with a water separator and the usual period of reflux is from 2 to 24 hours. After reflux the reaction mixture is evaporated to dryness. The residue is slurried with a lower alkanol such as methanol, ethanol, isopropanol, etc. and the solid material is filtered. The product may be further purified by recrystallization from ethanol ethyl acetate, hexane-acetone, chloroform, etc.

As employed herein the term "lower alkyl" is meant to include straight and branched chain hydrocarbon moieties of from one to about four carbon atoms such as methyl, ethyl, propyl, i-propyl and butyl. The term "(lower)alkoxy" is used to include hydrocarbonoxy groups which contain from one to about six carbon atoms such as methoxy, ethoxy, propoxy, butoxy and hexoxy. The term "halogen" and "halo" as used herein are meant to include bromine, fluorine, chlorine and iodine.

The compounds of the invention are useful anti-inflammatory agents which may be employed in comparative and experimental pharmacology as well as for other purposes. Those skilled in the art readily realize the desirability of employing control compounds which have demonstrated efficacy for inducing specific pharmacological effects when compounds of unknown activity are tested.

Activity of the compounds of the invention has been established by their ability to inhibit experimentally induced edema in the hind paw of the rat. Male Sprague-Dawley rats 120-160 grams are used. The compound is administered orally as a dispersion in distilled water (plus two drops of Tween 80) in a volume of 10 ml./kg. Compounds are given to six rats and vehicle alone is administered to six more rats as a control. Sixty minutes later, drug administration edema is induced by an injection of 0.05 ml. of a 1 percent carrageenin solution in physiological saline into the subplantar tissue of the rat's hind paw. Paw volume is then immediately measured volumetrically with a plethysmograph and again 3 hours later. The mean volume of swelling for the control group is calculated and compared to the test groups. Compounds that inhibit swelling approximately 23 percent in compound treated subjects are considered active. Inhibition is calculated by the formula:

Percent inhibition $$= \frac{\text{Mean volume swelling} - \text{Mean volume swelling}}{\text{Mean volume swelling of vehicle treated subject}} \times 100$$

The compounds of the invention are active anti-inflammatory agents when administered orally to mammals at dosages of from 10 to 100 milligrams per kilogram of body weight.

The above test is a standard test for anti-inflammatory screening and evaluation. (Winter et al., Proc. Soc. Exp. Biol. and Med. 111:544 1962; Buttle et al., Nature 179:629, 1957).

The following examples are added to illustrate but not to limit the scope of the invention:

EXAMPLE I

Fifteen grams of 2-(2-imidazolin-2-yl)benzhydrol, 9 g. of benzaldehyde, 0.5 g. of p-toluenesulfonic acid and 100 ml. of toluene are mixed together and refluxed in a flask equipped with a water separator. After refluxing 16 hours, the solution is evaporated to dryness in vacuo. The residue is slurried with ethanol and the solid is separated by filtration. Recrystallization from ethanol affords 2,3,5,6-tetrahydro-5,6-diphenylimidazo[2,1-a]isoquinolin-6-ol, m.p. 218°-220° C.

Anal. Calcd. for $C_{23}H_{20}N_2O$: C, 81.15; H, 5.92; N, 8.23.
Found: C, 81.38; H, 6.13; N, 8.39.

EXAMPLE II

Ten grams of 2-(2-imadazolin-2-yl)benzhydrol, 7 g. of 4-methoxybenzaldehyde, 0.5 g. of p-toluenesulfonic acid and 75 ml. of toluene are refluxed in a flask equipped with a water separator. Water ceases to separate after refluxing for 4 hours. The mixture is evaporated to dryness. The solid residue is slurried with ethanol and separated by filtration. On recrystallization from ethanol there is obtained 2,3,5,6-tetrahydro-5-(4-methoxyphenyl)-6-phenylimidazo[2,1-a]isoquinolin-6-ol, m.p. 249°-252° C.

Anal. Calcd. for $C_{24}H_{22}N_2O_2$: C, 77.81; H, 5.99; N, 7.56.
Found C, 77.70; H, 5.92; N, 7.28.

EXAMPLE III

Five grams of 2-(2-imidazolin-2-yl)benzhydrol, 7 g. of 3,4-dichlorobenzaldehyde, 0.2 g. of p-toluenesulfonic acid and 50 ml. of toluene are refluxed in a flask equipped with a water separator. After refluxing for 17 hours, the mixture is evaporated to dryness in vacuo. The solid residue is slurried with ethanol and separated by filtration. Recrystallization from ethanol affords 5-(3,4-dichlorophenyl)-2,3,5,6-tetrahydro-6-phenylimidazo[2,1-a]isoquinolin-6-ol, m.p. 251°-3 C.

Anal. Calcd. for $C_{23}H_{18}Cl_2N_2O$: C, 67.49; H, 4.44; N, 6.80; Cl, 17.33.
Found: C, 67.61; H, 4.31; N, 6.75; Cl. 17.30.

EXAMPLE IV

Ten grams of 4'-chloro-2-(2-imidazolin-2-yl)benzhydrol, 7 g. of 3,4-dichlorobenzaldehyde, 0.1 g. p-toluenesulfonic acid, and 90 ml. of toluene are refluxed for 18 hours in a flask equipped with a water separator. The mixture is cooled and the precipitated solid is separated by filtration. After washing with ethanol and drying, there is obtained 6-(p-chlorophenyl)-5-(3,4-dichlorophenyl)-2,3,5,6-tetrahydroimidazo-[2,1-a]isoquinolin-6-ol, m.p. 270°–3° C.

Anal. Calcd. for $C_{23}H_{17}Cl_3N_2O$: C, 62.26: H, 3.86; N, 6.31; Cl, 23.97.

Found: C, 62.26; H, 4.15; N, 6.40; Cl, 24.01.

EXAMPLE V

Ten grams of 4'-chloro-(2-imidazolin-2-yl)benzhydrol, 6 g. of pyridine-2-aldehyde, 0.1 g. of p-toluenesulfonic acid and 75 ml. of toluene are refluxed for 18 hours in a flask equipped with a water separator. The solution is extracted with water then evaporated to dryness. The solid residue is slurried with ethanol and separated by filtration. Recrystallization from ethanol affords 6-(p-chlorophenyl)-2,3,5,6-tetrahydro-5-(2-pyridyl)imidazo[2,1d-a]isoquinolin-6-ol, m.p. 235°–8° C.

Anal. Calcd. for $C_{22}H_{18}ClN_3O$: C, 70.30; H, 4.83; N, 11.18; Cl, 9.41.

Found: C, 70.01; H, 5.08; N, 11.04; Cl, 9.71.

EXAMPLE VI

Nine grams of 4'-chloro-2-[4,4 (or 5,5)-dimethyl-2-imidazolin-2-yl]benzhydrol, 4 g. of benzaldehyde, 0.1 g. of p-toluenesulfonic acid and 80 ml. of toluene are refluxed in a flask equipped with a water separator. After refluxing 17 hours, the mixture is cooled and the solid is separated by filtration. The solid is slurried with ethanol, filtered and dried to obtain 6-(p-chlorophenyl)-2,3,5,6-tetrahydro-2,2-dimethyl-5-phenylimidazo[2,1-a]isoquinolin-6-ol, m.p. 300°–2° C.

Anal. Calcd. for $C_{25}H_{23}ClN_2O$: C, 74.52; H, 5.75; N, 6.96; Cl, 8.80.

Found: C, 74.47; H, 5.74; N, 6.81; Cl, 8.98.

EXAMPLE VII

A mixture of 5.4 g. of 4'-fluoro-2-(2-imidazolin-2-yl)benzhydrol, 3 g. of thiophene-2-carboxaldehyde, 0.1 g. of p-toluenesulfonic acid and 100 ml. of toluene is refluxed in a flask equipped with a water separator. After refluxing for 7 hours, the mixture is filtered and cooled. The solid is separated and recrystallized from ethanol to obtain 6-(p-fluorophenyl-2,3,5,6-tetrahydro-5-(2-thienyl)imidazo[2,1-a]-isoquinolin-6-ol, m.p. 236°–8° C.

Anal. Calcd. for $C_{21}H_{17}FN_2OS$: C, 69.21; H, 4.70; N, 7.69; S, 8.80.

Found: C, 69.42; H, 4.81; N, 7.49; S. 9.03.

EXAMPLE VIII

A mixture of 5.4 g. of 4'-fluror-2-(2-imidazolin-2-yl)benzhydrol, 4 g. of 3,4,5-trimethoxybenzaldehyde, 0.1 g. of p-toluenesulfonic acid and 100 ml. of toluene is refluxed for 19 hours in a flask equipped with a water separator. The solution is filtered and cooled. The precipitated solid is separated and dried to obtain 6-(p-fluorophenyl)-2,3,5,6-tetrahydro-5-(3,4,5-trimethoxyphenyl)imidazo[2,1-a]isoquinolin-6-ol, m.p. 235°–7° C.

Anal. Calcd. for $C_{26}H_{25}FN_2O_4$: C, 69.63; H, 5.62; N, 6.25.

Found: C, 69.53; H, 5.74; N, 6.19.

EXAMPLE IX

Nine grams of 2-(2-imidazolin-2-yl)-4'-methylbenzhydrol, 5 g. of 2-chlorobenzaldehyde, 0.1 g. of p-toluenesulfonic acid and 250 ml. of toluene are refluxed for 19 hours in a flask equipped with a water separator. The mixture is evaporated to dryness in vacuo. The residue is slurried with hot ethanol and the solid is separated by filtration to obtain 5-(o-chlorophenyl)-2,3,5,6-tetrahydro-6-(p-tolyl)imidazo[2,1-a]-isoquinolin-6-ol, m.p. 289° C.

Anal. Calcd. for $C_{24}H_{21}N_2OCl$: C, 74.13; H, 5.44; N, 7.20; Cl, 9.12.

Found: C, 74.24; H, 5.09; N, 7.19; Cl, 9.27.

EXAMPLE X

A mixture of 8.5 g. of 2-(2-imidazolin-2-yl)-4'-methylbenzhydrol, 4.5 g. of p-chlorobenzaldehyde, 0.1 g. p-toluenesulfonic acid and 250 ml. of toluene is refluxed for 18 hours in a flask equipped with a water separator. The mixture is evaporated to dryness in vacuo. The solid residue is triturated with hot ethanol and separated by filtration to obtain 5-(p-chlorophenyl-2,3,5,6-tetrahydro-6-(p-tolyl)imidazo-[2,1-a]isoquinolin-6-ol, m.p. 272°–3° C.

Anal. Calcd. for $C_{24}H_{21}N_2OCl$: C, 74.13; H, 5.44; N, 7.20; Cl, 9.12.

Found: C, 74.02; H, 5.57; N, 7.06; Cl, 9.35.

EXAMPLE XI

By analogous procedures the following compounds are prepared:

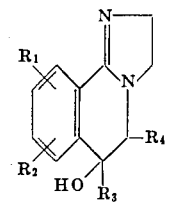

wherein $R_1$, $R_2$, $R_3$ and $R_4$ are defined as follows:

| $R_1$ | $R_2$ | $R_3$ | $R_4$ |
| --- | --- | --- | --- |
| 8-bromo | hydrogen | 4-iodophenyl | phenyl |
| 9-methoxy | hydrogen | 3,4-dimethylphenyl | phenyl |
| 8-chloro | 9-chloro | 4-methoxyphenyl | 3,4-dimethylphenyl |
| 8-methylamino | hydrogen | 4tirfluoromethylphenyl | 4-methylphenyl |
| 8-methyl | 9-methyl | 2,5-dibromophenyl | 4-methoxyphenyl |
| 7-ethoxy | hydrogen | 3,4-dimethoxyphenyl | 4-chlorophenyl |
| 8-methoxy | 9-methoxy | 2-thienyl | phenyl |
| 10-iodo | hydrogen | 4-propoxyphenyl | 5-fluorophenyl |
| 8-fluoro | 9-fluoro | 2-pyridyl | 4-ethoxyphenyl |
| hydrogen | hydrogen | 2,5-dipropoxyphenyl | 4-iodophenyl |
| 8-ethyl | hydrogen | 2-furyl | 4-ethylphenyl |
| 9-propylamine | hydrogen | 3,4-diethylphenyl | phenyl |
| 8-ethyl | 10-ethyl | tetrahydro-2-naphthyl | phenyl |
| hydrogen | hydrogen | 2,5-dibutylphenyl | phenyl |
| hydrogen | hydrogen | phenyl | tetrahydro-2-naphthyl |
| 8-ethoxy | hydrogen | 3-chlorophenyl | 4-propylphenyl |
| hydrogen | 8-methyl | 4-methylphenyl | 2-furyl |
| 8-methyl | 9-methyl | 4-iodophenyl | phenyl |
| 8-propoxy | hydrogen | 4-ethylphenyl | 2-thienyl |
| 8-amino | hydrogen | 4-chlorophenyl | phenyl |
| hydrogen | hydrogen | 3,5-dichlorophenyl | 4-trifluoromethylphenyl |
| hydrogen | 9-propyl | 4-fluorophenyl | 3,4-dichlorophenyl |
| hydrogen | hydrogen | 3,4-dimethoxyphenyl | 4-ethoxyphenyl |

The 2-(2-imidazolin-2-yl)benzhydrols which are employed as starting materials for the preparation of the compounds of the invention are described in U.S. Pat. application, Ser. No. 18,309, filed by Theodore S. Sulkowski and Albert A. Mascitti as of even date herewith. We claim:

1. A compound selected from the group consisting of:

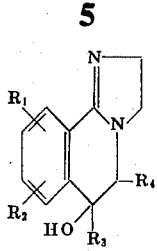

wherein $R_1$ is selected from the group consisting of hydrogen, halogen, amino, (lower)alkylamino, (lower)alkyl and (lower)alkoxy; $R_1$ is hydrogen when $R_1$ and $R_2$ are dissimilar and when $R_1$ and $R_2$ are the same they are both selected from the group consisting of hydrogen, halogen, (lower)alkyl and (lower)alkoxy; $R_3$ and $R_4$ are independently selected from the group consisting of phenyl, monohalophenyl, dihalophenyl, mono(lower)alkylphenyl, di(lower)alkylphenyl, trifluoromethyl, phenyl, mono(lower)alkoxyphenyl, di(lower)alkoxyphenyl, tri(lower)alkoxyphenyl, thienyl, pyridyl, furyl and tetrahydro-2-naphthyl.

2. A compound as described in claim 1 which is: 2,3,5,6-tetrahydro-5,6-diphenylimidazo[2,1-a]isoquinolin-6-ol.

3. A compound as described in claim 1 which is: 2,3,5,6-tetrahydro-5-(4-methoxyphenyl)-6-phenylimidazo[2,1-a]isoquinolin-6-ol.

4. A compound as described in claim 1 which is: 5-(3,4-dichlorophenyl)-2,3,5,6-tetrahydro-6-phenylimidazo[2,1-a]isoquinolin-6-ol.

5. A compound as described in claim 1 which is: 6-(p-chlorophenyl)-5-(3,4-dichlorophenyl)-2,3,5,6-tetrahydroimidazo[2,1e-a]isoquinolin-6-ol.

6. A compound as defined in claim 1 which is: 6-(p-chlorophenyl)-2,3,5,6-tetrahydro-5-(2-pyridyl)imidazo[2,1-a]isoquinolin-6-ol.

7. A compound as defined in claim 1 which is: 6-(p-chlorophenyl)-2,3,5,6-tetrahydro-2,2-dimethyl-5-phenylimidazo[2,1-a]isoquinolin-6-ol.

8. A compound as defined in claim 1 which is: 6-(p-fluorophenyl)-2,3,5,6-tetrahydro-5-(2-thienyl)imidazo[2,1-a]isoquinolin-6-ol.

9. A compound as defined in claim 1 which is: 6-(p-fluorophenyl)-2,3,5,6-tetrahydro-5-(3,4,5-trimethoxyphenyl)imidazo[2,1-a]isoquinolin-6-ol.

10. A compound as defined in claim 1 which is: 5-(o-chlorophenyl)-2,3,5,6-tetrahydro-6-(p-tolyl)imidazo[2,1-a]isoquinolin-6-ol.

11. A compound as defined in claim 1 which is: 5-(p-chlorophenyl)-2,3,5,6-tetrahydro-6-(p-tolyl)imidazo[2,1-a]isoquinolin-6-ol.

* * * * *